United States Patent
Watson et al.

(10) Patent No.: US 10,257,215 B2
(45) Date of Patent: Apr. 9, 2019

(54) IDENTIFYING AND DISABLING A ROGUE ACCESS POINT IN A PUBLIC WIRELESS ENVIRONMENT

(71) Applicant: Panasonic Avionics Corporation, Lake Forest, CA (US)

(72) Inventors: Philip Watson, Lake Forest, CA (US); Changhwa Lin, Irvine, CA (US); Michael Dierickx, Temecula, CA (US)

(73) Assignee: PANASONIC AVIONICS CORPORATION, Lake Forest, CA (US)

( * ) Notice: Subject to any disclaimer, the term of this patent is extended or adjusted under 35 U.S.C. 154(b) by 234 days.

(21) Appl. No.: 15/130,072

(22) Filed: Apr. 15, 2016

(65) Prior Publication Data
US 2016/0330229 A1   Nov. 10, 2016

Related U.S. Application Data

(60) Provisional application No. 62/159,163, filed on May 8, 2015.

(51) Int. Cl.
*H04L 29/06*     (2006.01)
*H04B 1/3822*    (2015.01)
(Continued)

(52) U.S. Cl.
CPC ....... *H04L 63/1433* (2013.01); *H04B 1/3822* (2013.01); *H04L 41/22* (2013.01);
(Continued)

(58) Field of Classification Search
CPC ..... H04W 12/12; H04W 64/00; H04W 88/08; H04W 4/12; H04L 63/14; H04L 63/1408;
(Continued)

(56) References Cited

U.S. PATENT DOCUMENTS

| 8,074,279 B1 | 12/2011 | Lin et al. |
| 2005/0171720 A1* | 8/2005 | Olson ................. H04L 63/1433 702/121 |

(Continued)

OTHER PUBLICATIONS

Han, Hao, et al. "Defending against vehicular rogue APs." INFOCOM, 2011 Proceedings IEEE. IEEE, 2011.*
(Continued)

*Primary Examiner* — Yogesh Paliwal
(74) *Attorney, Agent, or Firm* — Brian Furrer

(57) ABSTRACT

A system for identifying a wireless security threat on a vehicle. The system includes a broadband controller including a data processor and memory in which the broadband controller provides a network within the vehicle. The system includes a vehicle WAP in communication with the broadband controller in which the WAP broadcasts an SSID for use by a PED to establish a wireless communication link and transmit and receive data wirelessly over the network via the WAP. An SSID scanner periodically scans for SSIDs broadcast in the vehicle in which SSIDs detected during scans are communicated to the broadband controller. For a detected SSID corresponding to the vehicles WAP SSID, logic executed by the data processor compares the BSSID of the vehicle WAP with the BSSID from the detected SSID and if the BSSIDs do not match, the logic identifies a security threat.

17 Claims, 4 Drawing Sheets

(51) Int. Cl.
*H04W 4/12* (2009.01)
*H04L 12/24* (2006.01)
*H04L 29/08* (2006.01)
*H04W 12/12* (2009.01)

(52) U.S. Cl.
CPC .......... *H04L 63/1441* (2013.01); *H04L 67/12* (2013.01); *H04W 4/12* (2013.01); *H04W 12/12* (2013.01)

(58) Field of Classification Search
CPC . H04L 63/1433; H04L 63/1441; H04L 67/12; H04L 41/22; H04B 1/3822
USPC .......................................................... 726/25
See application file for complete search history.

(56) References Cited

U.S. PATENT DOCUMENTS

| | | |
|---|---|---|
| 2006/0193258 A1 | 8/2006 | Ballai |
| 2007/0081488 A1 | 4/2007 | Adya et al. |
| 2007/0298720 A1 | 12/2007 | Wolman et al. |
| 2011/0227709 A1* | 9/2011 | Story .................... B60R 25/102 340/10.42 |
| 2014/0177611 A1 | 6/2014 | Lopez |
| 2016/0277427 A1* | 9/2016 | Deshpande ......... H04L 63/1416 |

OTHER PUBLICATIONS

Yadav et al., Vehicular Rogue Access Point Detection Using Speed of Vehicle, Dec. 20, 2014.
Extended European Search Report for Application No. 16166634,2-1870, Dated Jun. 27, 2016.
European Examination Report (Communication Pursuant to Article 94(3) EPC) for Application No. 16166634.2-1870, Dated Jul. 7, 2016.

* cited by examiner

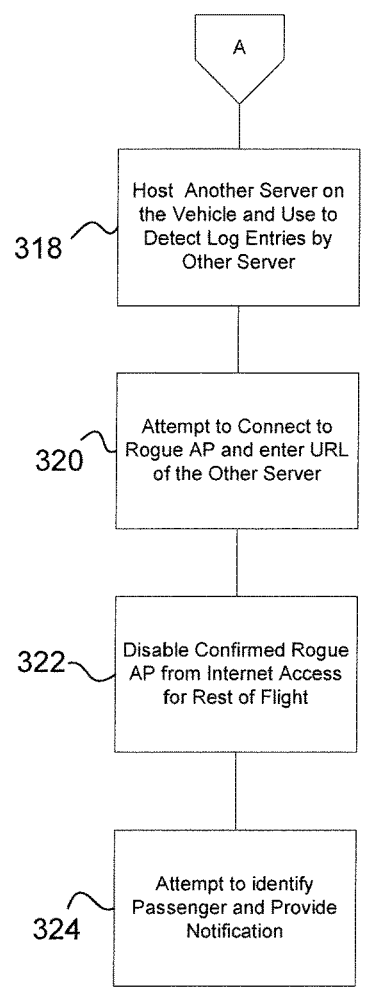

IDENTIFYING AND DISABLING A ROGUE ACCESS POINT IN A PUBLIC WIRELESS ENVIRONMENT

CROSS-REFERENCE TO RELATED APPLICATIONS

The present application is a non-provisional application of prior provisional U.S. Application Ser. No. 61/159,163, filed May 8, 2015. Priority to the foregoing provisional patent application is expressly claimed, and the disclosure of the provisional application is hereby incorporated herein by reference in its entirety and for all purposes

BACKGROUND

The field of the invention generally relates to provision of public wireless access points (WAPs), and more particularly, to provision of public WAPs on mass transportation vehicles.

Many vehicles of common carriers, such as airplanes, passenger trains, buses, cruise ships, and the like, have video and/or audio entertainment systems, crew communication systems, and similar systems. For example, many commercial airplanes have individualized video and audio entertainment systems, often referred to as in-flight entertainment (IFE) systems. More recently, IFE systems have been begun offering Internet connectivity to passengers via one or more WAPs in the aircraft.

One of the problems with offering connectivity through WAPs is security. For example, passengers may use a personal electronic device (PED) or other passenger owned equipment to set up an unauthorized personal WAP, which is referred to herein in the description as a "rogue" access point. One of the difficulties with rogue access points is detection by the IFE system. Conventional detection methods involve inaccurate heuristics on monitoring network traffic, and are not always accurate.

A wireless distribution network on a vehicle includes a combination of line replaceable units (LRUs) that route data traffic and support branches for overhead, in-seat and remote crew management services. The distribution LRUs include at least one WAP, which connects wireless devices to a wireless network. Most WAPs support standard WEP and WPA encryption.

SUMMARY

A system for identifying a wireless security threat on a vehicle in which the system is for use with wireless personal electronic devices. The system includes a broadband controller including a data processor and memory, in which the broadband controller provides a network within the vehicle. The system also includes a vehicle wireless access point in communication with the broadband controller in which the wireless access point broadcasts an SSID for use by a personal electronic device to establish a wireless communication link and transmit and receive data wirelessly over the network via the wireless access point. In addition, an SSID scanner is configured to periodically scan for SSIDs broadcast in the vehicle in which SSIDs detected during scans are communicated to the broadband controller. Logic executed by the data processor of the broadband controller compares for each detected SSID corresponding to the vehicle wireless access point SSID, the BSSID of the vehicle wireless access point with the BSSID from the detected SSID. If the BSSIDs do not match, the broadband controller logic identifies a security threat.

In one aspect, the system further includes an antenna connected to the broadband controller. The antenna receives and transmits signals from a source external to the vehicle, providing a broadband data connection to the broadband controller, over which the broadband controller logic reports the security threat to an external security operation center. In a more detailed aspect, the system includes a web server having a private wide area network address operated by the broadband controller logic, in which the web server is only accessible via the private wide area network address. Further, the web server logs the source IP address of any access to the web server.

In a further detailed aspect, the system includes another server operated by the broadband controller logic. This another server detects new log entries by the other server, and determines the MAC address corresponding to the source IP address and the broadband controller logic blocks access to the network by a client having that MAC address. In another aspect, the system includes a display connected to the network in which each detected SSID that does not correspond to an SSID broadcast by the wireless access point, is shown on the display. In yet another aspect, the vehicle wireless access point includes multiple radios and the SSID scanner is one of the foregoing radios, another vehicle wireless access point connected to the broadband controller, and/or a personal electronic device.

Further disclosed is a method for identifying a wireless security threat on a vehicle in which the vehicle includes a vehicle wireless access point having a BSSID and broadcasting a vehicle SSID for connecting a personal electronic device in wireless communication with the wireless access point. The method includes periodically detecting SSIDs broadcast on the vehicle, comparing detected SSIDs with the vehicle SSID; for each detected SSID corresponding to the vehicle SSID, comparing the BSSID of the wireless access point with the BSSID of the detected SSID, and if the BSSIDs do not match, determining there is a security threat.

In another aspect, the method further includes hosting a web server on the vehicle having a private wide area network address, in which the web server is only accessible via the private wide area network address, and storing the IP address of each access to the web server in a log. In a more detailed aspect, the method further includes hosting another server on the vehicle, in which the another server detects entries in the log, determining the MAC address corresponding to the IP address for each entry, and blocking communication access by a client having the determined MAC address. In an even more detailed aspect, the method includes determining the identity of the passenger associated with the client and notifying the passenger that access is being blocked.

In yet another aspect, the method includes providing on a display each detected SSID that does not correspond to an SSID broadcast by the vehicle wireless access point. In still another aspect, the method includes periodically detecting SSIDs broadcast on the vehicle by using a radio of the vehicle wireless access point, using another wireless access point, or using a personal electronic device that is operated by a trusted agent.

In a different aspect, a system is disclosed for identifying a potential wireless security threat on a vehicle in which the system is for use with wireless personal electronic devices. The system includes a display and a broadband controller including a data processor and memory, in which the broadband controller provides a network within the vehicle. The system also includes a vehicle wireless access point in communication with the broadband controller in which the wireless access point broadcasts an SSID for use by a personal electronic device to establish a wireless communication link and transmit and receive data wirelessly over the network via the wireless access point. The system includes an SSID scanner configured to periodically scan for SSIDs broadcast in the vehicle in which SSIDs detected during scans are communicated to the broadband controller. The system includes logic executed by the data processor of the broadband controller in which for each detected SSID not corresponding to the vehicle wireless access point SSID, that detected SSID is shown on the display or reported to the broadband controller.

In another aspect, the vehicle wireless access point includes more than one radio and the SSID scanner is one of the radios, another vehicle wireless access point connected to the broadband controller, and/or a personal electronic device operated by a trusted agent.

In yet another aspect, the system includes a web server having a private wide area network address operated by the broadband controller logic, in which the web server is only accessible via the private wide area net. Moreover, the web server logs the source IP address of any access thereto.

In a more detailed aspect, the system includes a dedicated PED including at least a wireless radio that can perform as a client for rogue APs, a data processor and logic which when the logic is executed by the data processor, performs detection of SSIDs that do not match a vehicle SSD, and attempts to connect to each SSID that does not match a vehicle SSID, and if successful, further attempts to connect to the web server having a private wide area network address. The logic is in the form of a software application installed on the dedicated PED in non-volatile memory, such as in flash memory.

In still another aspect, the logic, for a detected SSID corresponding to a vehicle wireless access point SSID, compares the BSSID of the vehicle wireless access point with the BSSID from the detected SSID and if the BSSIDs do not match, the broadband controller identifies a security threat.

In yet another aspect, the system further includes an antenna connected to the broadband controller, in which the antenna receives and transmits signals from a source external to the vehicle, providing a broadband data connection to the broadband controller, over which the broadband controller logic reports a security threat to an external security operation center.

In another aspect, the system further includes another server operated by the broadband controller logic. The another server detects new log entries by the other server, and determines the MAC address corresponding to the source IP address and the broadband controller logic blocks access to the network by a client having that MAC address. In a more detailed aspect, the system includes cross-referencing logic to determine the identity of a passenger associated with the client having that MAC address, and notify the passenger of why access was blocked.

BRIEF DESCRIPTION OF THE DRAWINGS

The foregoing and other aspects of the disclosure are described in further detail with reference to the accompanying drawings, wherein like reference numerals refer to like elements and the description for like elements shall be applicable for all described aspects wherever relevant, wherein:

FIGS. 3 and 4 illustrate a process or method described in the following description.

DETAILED DESCRIPTION

Figure 1:
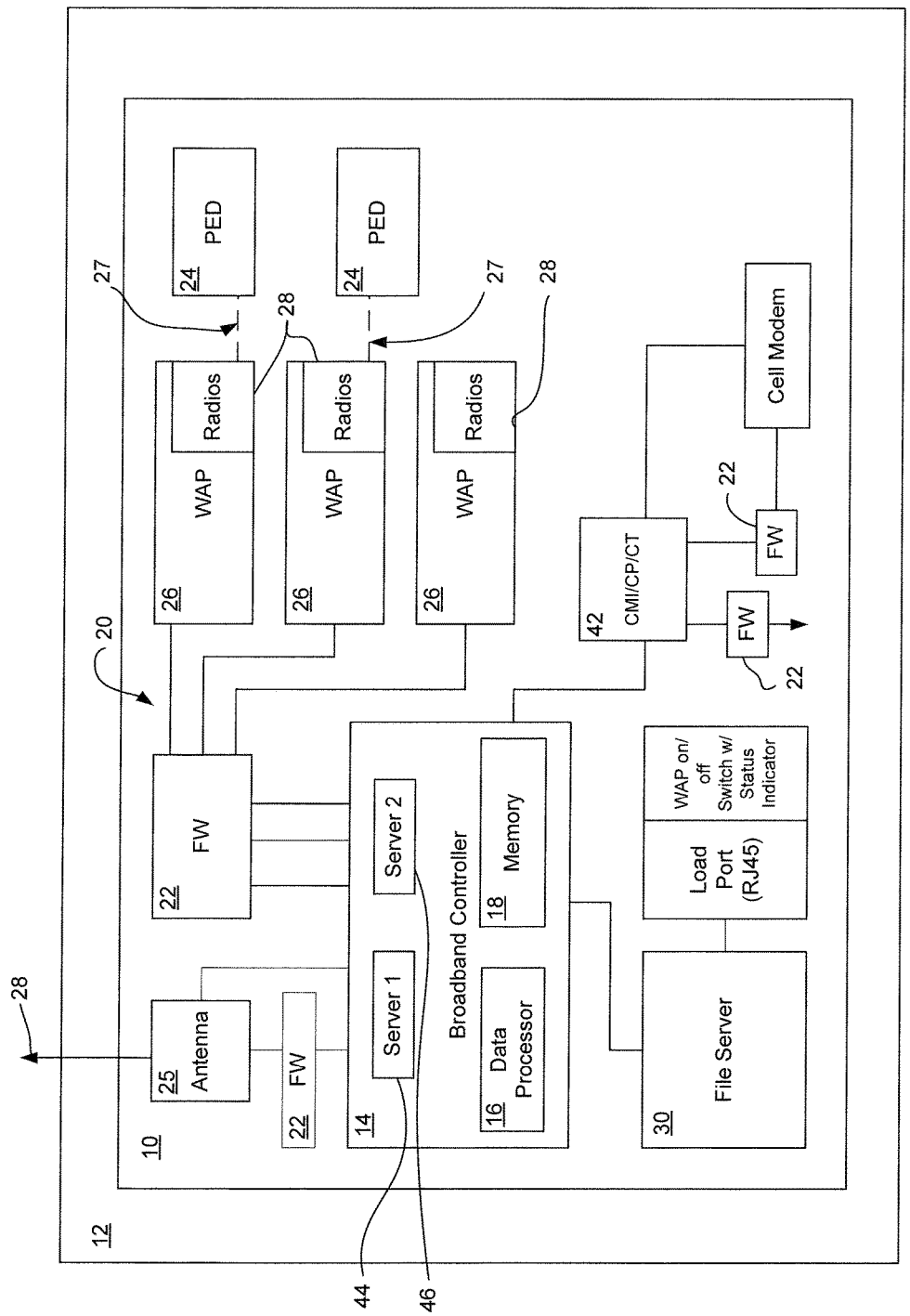
FIG. 1 is a block schematic diagram of the system architecture.

Referring to FIG. 1, a system 10 is for use on a vehicle 12, such as a ship, ferry, train, bus, aircraft, or other passenger transport vehicle. The system 10 in at least one aspect comprises a broadband controller (BC) 14, including a data processor 16, such as one or more central processing units (CPUs), and memory 18, such as a random access memory (RAM), read only memory (ROM), flash memory, and/or other types of memory as known in the art, for example, a solid-state drive (SSD), disks, etc.

Figure 2:
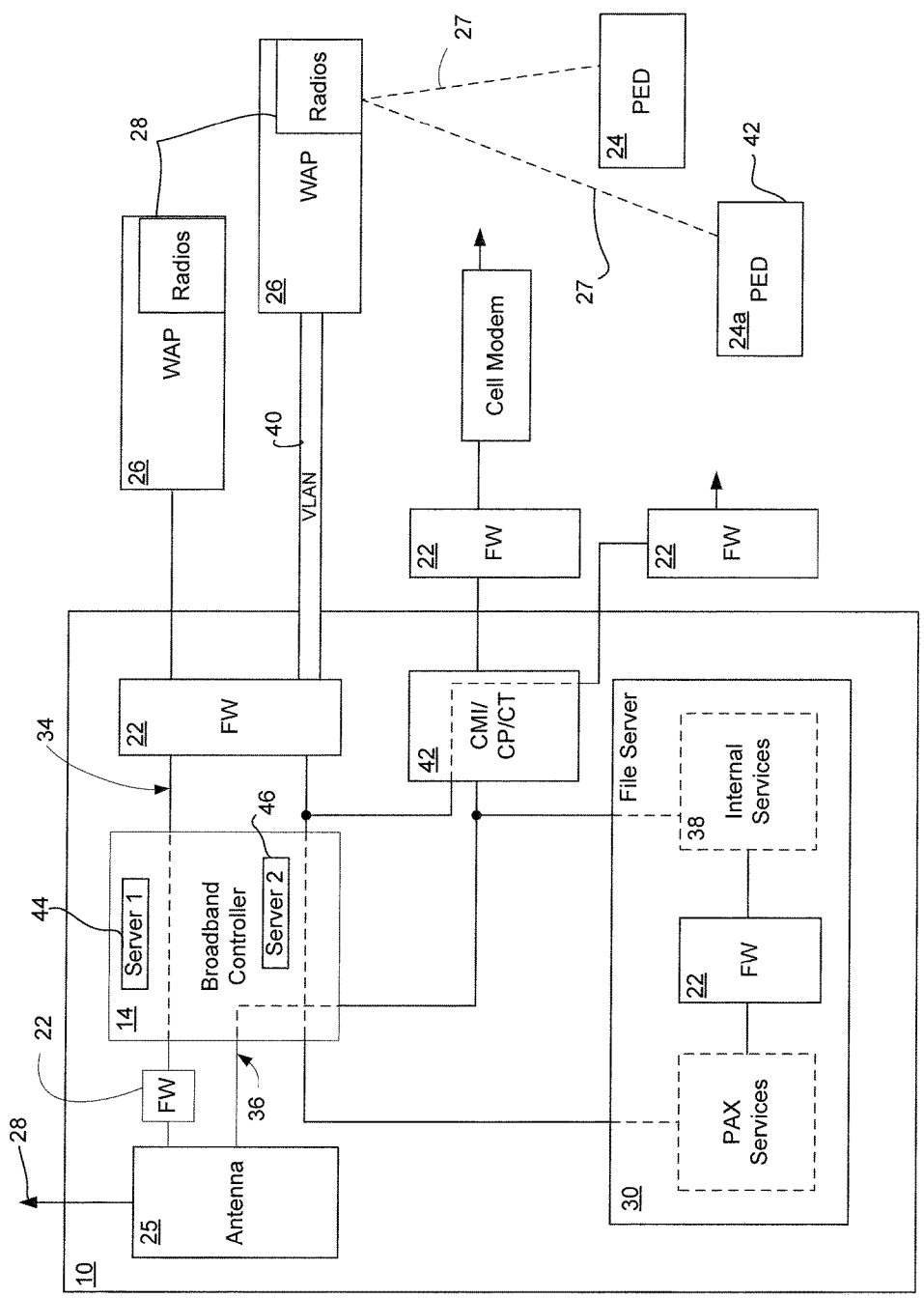
FIG. 2 is a block schematic diagram of the system network.

The broadband controller 14 provides a network, indicated generally by reference numeral 20, within the vehicle 12. An important objective in the disclosed system 10 is to segregate passenger (untrusted) traffic 34 from system or trusted traffic 36 (see FIG. 2). The system 10 maintains this logical segregation through the use of various techniques described below.

In this regard, the system 10 includes network firewalls 22 between the passenger network and the rest of the system 10, and is used to restrict access to internal network services 38 provided for the system itself. This blocks all network traffic from passenger PEDs 24 from transiting into the internal system.

In addition, each LRU that is a gateway to the Internet (a Gateway LRU) has its own firewall 22 that protects itself by routing only specified ports and protocol traffic therethrough into the system subnet. This is done through the use of firewall rules that (by default) reject all incoming traffic from the Internet-connected link. (Third-party LRUs may use alternative but equivalent Gateway enforcement techniques.) There are a number of different traffic restriction controls implemented within each Gateway.

Each LRU that directly connects to PEDs 24 is a PED Gateway. Similar to the Internet Gateway LRU, the PED Gateway has a firewall 22 that protects itself from all PED traffic, rejecting all traffic from the PED link and instead forwarding it to the defined Internet Gateway.

The broadband controller 14 is both an Internet Gateway and a PED Gateway. In particular, the broadband controller 14 controls traffic between an antenna 25 to an external communication source 28, e.g., satellite or ground station, and the rest of the system 12, including passenger data flows 34. In alternative systems without a broadband controller 14, a file server 30 provides the latter function and acts as a PED gateway. For example, a configuration may be provided that supplies streaming content from a server 30 aboard the vehicle 12 via a wireless network, but no connectivity external to the vehicle is provided for passengers.

There are LRUs that coexist in both the passenger and the system subnets in order to offer local services to PEDs 24 (such as the file server 30). These will implement the same PED traffic rules as if they were a PED Gateway.

The security rules that control service access are embodied in the software on the Gateway LRUs and are controlled centrally. Thus, they can only be changed by the system supplier or owner with a valid software update. However, some level of configurable and run-time control is allowed of the service set identifier (SSID) for each WAP 26. These include changing the allowed rate limits (up to and including disabling of an SSID). These can be carried out by network commands using a known or proprietary protocol. In this regard, the system 10 includes at least one vehicle WAP 26, and preferably several WAPs on large vehicles, such as wide-body aircraft, for ensuring adequate signal strength throughout a passenger cabin. Each WAP 26 includes at least one radio 28, and typically several radios, for use by PEDs 24 in the vehicle 12 to establish a wireless communication link 27 and transmit and receive data wirelessly over the network 20 via a WAP. More particularly, each WAP 26 broadcasts an SSID for use by a PED in connecting to a WAP.

Most Gateways connect external devices through a network switch interface. These switches are controlled through a managed port that is wired directly to the Gateway host CPU. Each switch is configured with multiple, disjointed, port-based VLANs (virtual local area networks) 40 that force traffic through the Gateway's firewall and then forwards it to the destination for that traffic. In this way all packets (attempted intrusions, data requests, etc.) must pass through a device that is aware of all the security rules for the system. Gateways without switches have dual Network Interface Card (NIC) interfaces (external and internal) that achieve the same firewall packet inspection and forwarding.

When a crew device connects through a port, e.g., a RJ45 port, and routes PED packets from a virtual local area network (VLAN) port to a Gateway, it enforces the source IP address routes PED packets from the VLAN port to the Gateway.

Incoming traffic from the PED network to the Gateway only allows desired services into the onboard server or servers 30 (such as HTTP, SMTP, FTP) as configured. Each allowed service will be vetted for security holes to ensure no protected content is accessible by the enabled PED services.

To prevent passengers from seeing or otherwise interfering with another passenger's experience, the systems described herein do not allow traffic to move from one PED 24 to another, either within WAPs 26 or at the Gateway routers.

The systems described herein use a custom avionics WAP 26 and so can take all necessary measures to ensure security. WAPs are commercially available from manufacturers, such as VT Miltope, of Hope Hull, Ala. Each WAP 26 contains a wireless network adapter and a wired adapter. Routing from wireless to wired is not supported except for the discussed default gateway (that is, all packets from the wireless network are immediately forwarded to the configured gateway).

In order to prevent duplicate IP addresses, clients (PEDs 24) should not be configured to use static IP addresses on their wireless adapter. WAPs 26 will reject any traffic not within the range defined for their assignment by DHCP.

Incoming traffic from PEDs 24 not destined for the Gateway itself can be redirected to another server (for protected/aliased services, such as HTTP), dropped (in the case of PED to internal network traffic), or routed to the Internet gateway. Routing through an Internet gateway can be controlled by registration on the Gateway (i.e., only those PEDs 24 that register (user/password, payment) can get out; until then, traffic is redirected to a Gateway so they know what to do). This also restricts passengers from getting at content on any other internal servers, though those servers also protect themselves.

Modern aircraft connect to the system over Ethernet to provide dynamic flight information and to share network devices with each other, e.g., aircraft WAPs 24, gate links, etc. The Gateway to the airframe-provided systems enforces this using a firewall 22 to allow only traffic types as agreed with the airframe vendor on that bus. At all times, the gateway (typically the broadband controller 14) maintains separation of system traffic 36 from passenger traffic 34 using the different VLANs.

When a wireless system as described here is integrated with IFE, the IFE servers are directly connected to the aircraft and provide the above function.

In prior systems, it is possible for a heavy user of network traffic and users intent on a denial of service attack to suddenly blast out requests or requests so much data the system cannot get its own data through. The wireless systems described herein protect against this in a number of ways.

One of the ways is that the WAPs 26 include provisions for remote maintenance control, but only from the system subnet, to reduce the allowed flow from or even to disable a specific PED 24 by MAC (media access control) address.

In addition, automated security actions may be included. Such automated controls can substitute for typical live security monitoring of a ground installation.

The file server 30 is configured to provide data services to PEDs 24, and so is configured to limit outbound traffic to defined rates. This is accomplished using traffic-shaping tools with rules that preserve bandwidth for system functions and fairly divide the remaining bandwidth among the clients. Each client will have a guaranteed minimum bandwidth available to it, and will also be able to use up some unused bandwidth from other users not using all their budgeted bandwidth.

A WAP 26 cannot individually limit traffic from each PED, but it can limit the cumulative traffic that it forwards into the system network. Because the total wireless bandwidth and the configuration of WAPs 26 may vary on each aircraft or vehicle 12, the bandwidth limit is configurable. It can also be changed dynamically (up to and including disabling a WAP 26).

Shaping limits are initially set by configuration data. Any changes in flight may come from a central security management application that may perform these actions automatically or manually through crew action, including disabling of a WAP 26.

A system 10 onboard the vehicle 12 is limited in bandwidth use by the external connection, i.e., satellite speed or ground station speed. However, the vehicle onboard Wi-Fi network has much more bandwidth than offered from the satellite or ground station and hence has plenty of capacity.

Nonetheless, video streaming consumes extensive wireless bandwidth. To prevent overwhelming a WAP 26, the system described herein enforces bandwidth allocation for each WAP, ensuring at least 3 Mbps and also monitors bandwidth usage on each WAP and rejects new streaming clients that would cause that WAP to exceed its allocation. If a WAP radio 28 is full the user will be directed to associate to another channel. Users will be directed to prefer the faster 5 GHz radios, if their device supports it.

Users may intentionally or unintentionally, e.g., leaving a device in 'Internet sharing mode' on, set up competing wireless access points on the vehicle 12. At the least, these compete with the WAPs 26 for the same frequency space; worse, they may share a single connection with family, friends, or anyone; and worst, they may masquerade as vehicle access points, using the same SSID and transparently offer the same services, and attempt to capture information from any unsuspecting user.

This risk is the same as can be found with any public wireless infrastructure, e.g., hotels, airports, coffee shops, etc. Users of wireless networking should be aware of the risks and take appropriate measures to protect their devices and data. Such a statement should be included in a Terms of Service (TOS) agreement to which a user must agree before using the service; in addition, the carrier or airline may wish to proactively inform potential users via means other than the service itself, such as seatback flyers or emails to users.

For the casual rogue access points (APs), passengers are already informed to disable all wireless devices, for reasons of vehicle safety, so they should not be present. But studies have shown that many passengers forget or neglect to do so and so some level of radio frequency (RF) competition should be expected. There may also be technically savvy passengers who set up a local network to share data among their own devices or family and friends. Nevertheless, these rogues do not present a security risk, and unless the airlines Terms of Service/Use/Carriage forbid this, should not necessarily be punished The second category, a rogue AP sharing a single session, is mainly a commercial problem due to lost revenue should a wireless Internet service provider (WISP) offer unlimited bandwidth by trip or time. One existing mitigation to this problem is that the bandwidth allocation enforces is "equal shares" by user, such that if ten users are sharing a "single user" as far as the system is concerned, they will each get one tenth of what they would have gotten if they purchased their own connection. This may not be an issue for light users, but again it is something that heavy users would be aware of and should reduce the instances of sharing. A carriers' terms of services (TOS) and even social media campaigns might be used to raise this awareness.

A second mitigation to this problem would be to change the billing method, to bill by Megabyte (MB). While it doesn't guarantee equal revenue for low bandwidth users (5 users, who would have to buy 5 individual packages of X MB, may be able to share less than 5× together) it does discourage sharing because the more users, the more it will likely cost.

A possible third mitigation is if a wireless intrusion detection system (WIDS) is present, would be to identify the session that the rogue AP is sharing and deny that client from using the system. This has to be carefully done to avoid knocking off clients who are not violating the TOS, and hence will not capture all sharing rogues. This is an optional feature that may require additional hardware.

For the third class, which is referred to herein as an "evil twin" access point or "evil rogue," passengers should be cautioned again to exercise the same cautions they would use in a ground public hotspot, to connect only to the proper SSID and to carefully monitor all browser security warnings, or better to use a virtual private network (VPN) for all traffic when using public access points. Since the evil twin is clearly malicious, actively taking it down would be desirable (see wireless intrusion prevention system (WIPS) below.) Since it uses the same SSID, detection is easy and not subject to false positives.

To accommodate active monitoring and response to these issues, a WAP radio 28 may be dedicated to act as a wireless intrusion detection system (WIDS), listening to all transmissions (and wireless channels) and could be configured to prevent such use (that is as a WIDS), to take action to render ineffective such unauthorized usage of the spectrum, especially sharers and evil twins. This would require airline authorization, as such actions could cause passenger devices to reset and lose information.

A WAP 26 cannot prevent direct, peer-to-peer PEDs communication over an ad-hoc wireless network; the WAP 26 is not used at all during the exchange. Additionally, PED-created ad-hoc networks may use the same frequency and bandwidth as the WAP networks.

Ad-hoc wireless networks require the cooperation of all parties to the network, but many PEDs 24 are configured to allow ad-hoc connections without express knowledge of the owner. Therefore, the wireless systems herein cannot provide for the security of any wireless PED 24.

Typical office settings use an access point network. When a client attaches to a WAP 26, even PED-PED communications must pass through the defined Gateway. Therefore, systems as described herein cannot be used to directly hack into another PED 24.

All wireless users should understand that the use of wireless communication devices allows any other wireless client to receive all packets sent from and received by all clients. If a PED 24 is going to carry out sensitive communications, methods should be used to encrypt each packet (such as a VPN, secure shell (SSH), etc.) so as to mitigate the risk of eavesdropping.

Where wireless techniques are used for sensitive traffic (such as transmission of credit card data for purchases), encryption is mandatory to avoid eavesdropping and masquerading. Systems in accordance with the present disclosure include an SSL certificate in its onboard server 30 that collects credit card data, signed by a well-known certificate authority, and all sensitive information will be collected over HTTPS.

Where the carrier wishes to operate private wireless networks, the WAPs 26 can be configured to operate with hidden SSIDs, with encryption in place. Wireless Equivalent Privacy (WEP) encryption, due to its known flaws, should not be relied upon and is not preferred. The WAPs 26 support the state of the art encryption method, including 802.11i ("WPA2") in both pre-shared-key (PSK) and enterprise modes. WPA-PSK/TKIP should not be used due to known attacks that can extract the wireless key for known SSIDs in seconds and is therefore not preferred.

In one aspect, a rogue AP is detected in the disclosed systems by including a trusted agent 42 on the vehicle 12 who has a wireless PED 24a. This substitutes for dedicating a WAP radio 28 to this function or installing an extra WAP 26. The agent periodically checks a crew terminal GUI screen of the system for "strange" SSIDs and if discovered, attempts to connect and follow provided instructions to trigger their deactivation.

As used hereafter a rogue AP is defined as a WAP that is not provided with the system 10. A local rogue is defined as a rogue IP that does not offer Internet connectivity. A sharing rogue is defined as a rogue AP that shares a single client link with multiple wireless clients, which may be public or private. Finally, an evil rogue is defined hereafter as a rogue AP, which may also be a sharing AP, that masquerades as a system WAP using the same SSID as a configured system SSID. It may masquerade with a passenger public SSID, or using a private, hidden SSID, e.g., such as is provided for exclusive vehicle crew use.

There are some limitations to detecting rogue APs using the above described technique. First, private sharing rogues that encrypt their wireless connection cannot be detected because the onboard agent 42 will not be able to connect. A ground-based heuristic would have to be applied. Second, a sharing rogue using a VPN for all its off board traffic also cannot be detected because it will appear to be using an alternative means of connecting to the Internet, e.g., a portable Wi-Fi access point such as a wireless router sold under the trademark MiFi, using an authorized system connection. Third, it is possible that an active attacker could recognize or identify the traffic that knocks the attacker's rogue AP offline and disable such action in the future.

Nonetheless, the systems and methods described herein have several advantages. First, there should NOT be false positives, including triggering on a "left on" portable access point that is operating on ground or via an authorized system connection, e.g., a purchased session. They should not trigger on ad-hoc wireless networks between passengers. Finally, they should not trigger on a rogue AP that does NOT offer off board access via an authorized system connection.

Figure 3:
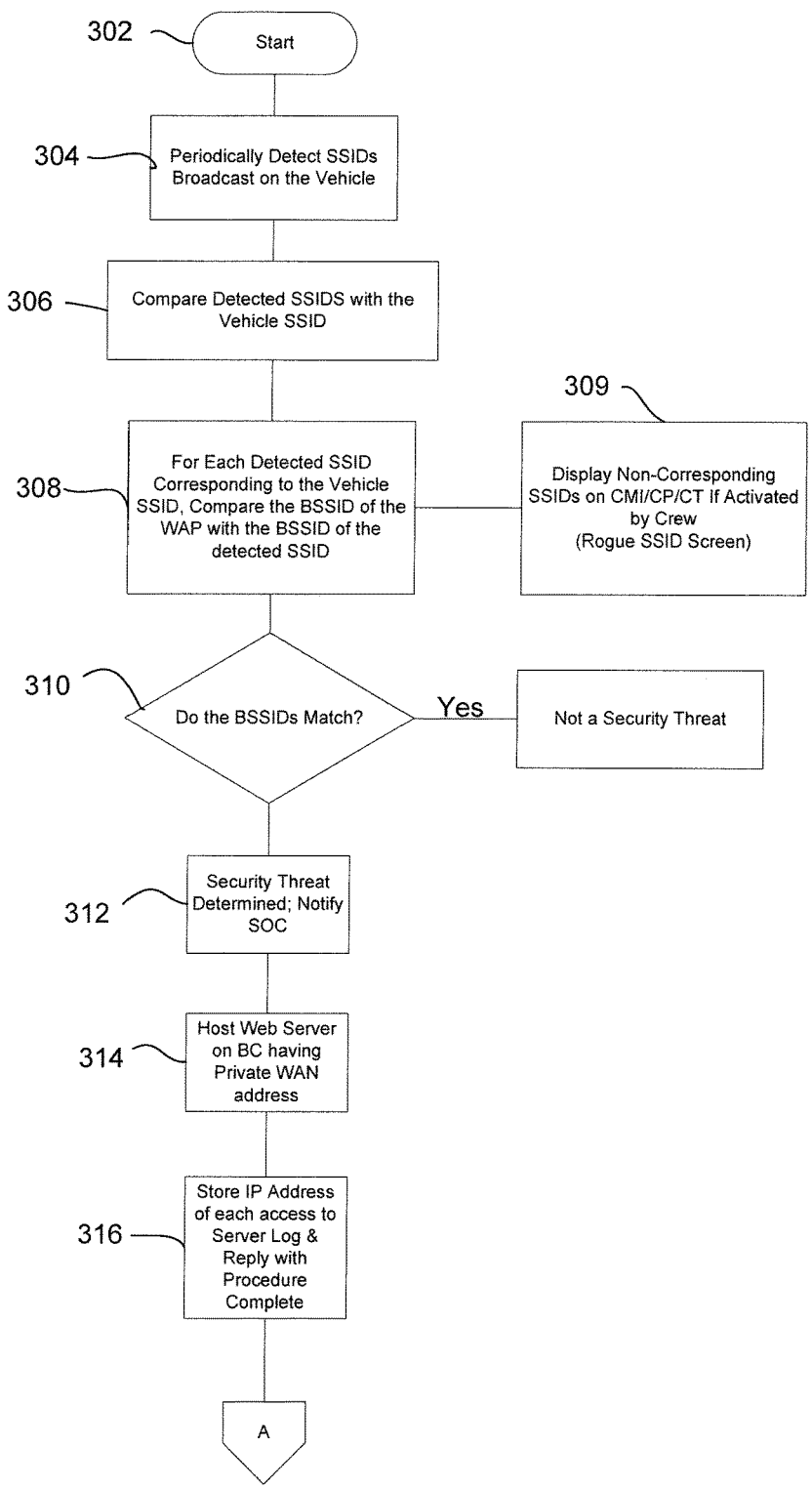

The systems and methods include at least one 802.11N (or other protocol) WAP 26 periodically scanning at a configurable rate for rogue SSIDs, i.e., unexpected SSIDs on each radio's assigned channel, without adversely significantly affecting available passenger bandwidth as shown in block 304 of FIG. 3 after the initial start block 302 of the method or process. If there is an unused radio 28, e.g., an unused 2.4 GHz radio on board or other unused radio at another frequency such as 5 GHz, it may be dedicated to this function. Each scanning WAP reports all rogue SSIDs and basis service set identifiers (BSSIDs) to the broadband controller 14. The broadband controller 14 logs all such reports to a file that is offloaded each trip. The broadband controller 14 detects or determines if any rogue SSIDs are using the same SSID string (henceforth called an evil AP) as an official SSID configured on the vehicle 12 for passenger, crew, or other uses as shown in block 306.

In particular, the broadband controller 14 compares the known BSSIDs of the wired system WAPs 26 to all APs using that SSID as in block 308; and any AP's BSSIDs that do not match (block 310) are flagged as evil APs. If any evil APs are detected, the broadband controller 14 offloads that information immediately to a Security Operations Center (SOC), or once connectivity is established as shown in block 312. In addition, a new Rogue SSID screen is shown that displays all detected rogue SSIDs for crew personnel, e.g., on a crew management interface (CMI) 42 or other display, e.g., crew panel (CP), crew terminal (CT), etc. as indicated in block 309. Further, the system provides offensive SSIDs. The rogue SSIDs are preferably only displayed upon crew activation of that feature.

The broadband controller 14 operates a web server 44 (see FIGS. 1 and 2) only accessible via its private WAN address (i.e., the client must have access to the Internet and must be on a private network to a satellite or ground station) via TLS or SSL as indicated in block 314 of FIG. 3. This server logs the source IP of all such access and replies with a "procedure complete" page or response as shown in block 316. The crew is expected to attempt to connect to the rogue APs, and if successful, enter the URL of the above server 44 (see block 320 of FIG. 4). If the rogue AP is providing Internet access, the crew's browser will succeed in connecting. If the rogue is using a VPN for all traffic to the ground, the connection will fail.

Continuing the process in FIG. 4, another server (a "Rogue AP enforcer") 46 on the broadband controller 14 (see FIGS. 1 and 2) detects new log entries by the above server 44 and determines the wireless MAC address of the source IP address and any reported DHCP client identifier by further inspecting other internal logs as shown in blocks 318 and 320. That MAC address, having been confirmed to be the client by which the rogue AP is offering Internet access, is disabled by the broadband controller 14 from further Internet access for that trip or flight (block 322). All such actions are logged to the same rogue AP log file and also offloaded immediately to the SOC (for interested carrier and WISP notification so that they might be able to take further action). The airline might want to try to do attribution with the information provided to identify the flying passenger. The WISP might want to notify the passenger via the email address provided why their session was terminated.

The system may optionally employ other techniques for detecting rogue APs. Such as:

Looking for "heavy" Internet users, which can indicate multiple users operating as one client. Disadvantage: false positives.

Looking for multiple browsers in use by inspecting user-agent field of HTTP requests. Disadvantage: unable to inspect HTTPS traffic or traffic within a VPN. Also can be a false positive for a single user with multiple computers.

Looking for TTLs (Time to Live) that differ by one in the IP header as described U.S. Pat. No. 8,074,279, filed Dec. 28, 2007, the disclosure of which is hereby incorporated herein by reference. Disadvantage: Cannot inspect VPN traffic; can be bypassed by smart rogue AP; cannot be sure what the TTL "should be" so false positives can result Although particular aspects have been shown and described, it is to be understood that the above description is not intended to limit the scope of these described systems and methods. While variations of the many aspects of the invention have been disclosed and described herein, such disclosure is provided for purposes of explanation and illustration only. Thus, various changes and modifications may be made without departing from the scope of the claims. For example, not all of the components described in the foregoing paragraphs are necessary, and the invention may include any suitable combinations of the described components, and the general shapes and relative sizes of the components may be modified. Accordingly, described aspects are intended to exemplify alternatives, modifications, and equivalents that may fall within the scope of the claims. Limitations therefore should be based only on the claims.

What is claimed is:

1. A system for identifying a wireless security threat on a vehicle in which the system is for use with wireless personal electronic devices, the system comprising:

a broadband controller including a data processor and memory in which the broadband controller provides a network within the vehicle;

a vehicle wireless access point in communication with the broadband controller in which the wireless access point broadcasts an SSID for use by a personal electronic device to establish a wireless communication link and transmit and receive data wirelessly over the network via the wireless access point;

a radio aboard the vehicle, the radio being configured to periodically scan for SSIDs broadcast in the vehicle in which SSIDs detected during scans are communicated to the broadband controller;

logic executed by the data processor of the broadband controller in which for a detected SSID corresponding to the vehicle wireless access point SSID, the logic compares the BSSID of the vehicle wireless access point with the BSSID from the detected SSID and if the BSSIDs do not match, the logic identifies a security threat;

an antenna connected to the broadband controller, in which the antenna receives and transmits signals from a source external to the vehicle, providing a broadband data connection to the broadband controller, over which the broadband controller logic reports any security threats to an external security operation center; and a web server having a private wide area network address operated by the broadband controller logic in which the web server is only accessible via the private wide area network address and in which the web server logs the source IP address of any access thereto.

2. The system of claim 1, further comprising another server operated by the broadband controller logic, which detects new log entries by the other server, and determines the MAC address corresponding to the source IP address and the broadband controller logic blocks access to the network by a client having that MAC address.

3. The system of claim 1, further comprising a display connected to the network in which each detected SSID that does not correspond to an SSID broadcast by the wireless access point, is shown on the display.

4. The system of claim 1, wherein the vehicle wireless access point includes a plurality of radios and said radio aboard the vehicle being configured to periodically scan for SSIDs comprises at least one of a radio of said plurality of radios and another vehicle wireless access point connected to the broadband controller.

5. A method for identifying a wireless security threat on a vehicle in which the vehicle includes a vehicle wireless access point having a BSSID and broadcasting a vehicle SSID for connecting a personal electronic device in wireless communication with the wireless access point, the method comprising:
periodically detecting SSIDs broadcast on the vehicle;
comparing detected SSIDs with the vehicle SSID;
for each detected SSID corresponding to the vehicle SSID, comparing the BSSID of the wireless access point with the BSSID of the detected SSID and if the BSSIDs do not match, determining there is a security threat;
hosting a web server on the vehicle having a private wide area network address, in which the web server is only accessible via the private wide area network address; and
storing the IP address of each access to the web server in a log.

6. The method of claim 5, further comprising:
hosting another server on the vehicle, in which the another server detects entries in the log;
determining the MAC address corresponding to the IP address for each entry; and
blocking communication access by a client having the determined MAC address.

7. The method of claim 6, further comprising determining the identity of the passenger associated with the client and notifying the passenger that access is being blocked.

8. The method of claim 7, wherein said determining the identity of a passenger associated with the client and notifying the passenger of why access was blocked, includes notifying the passenger via an email address.

9. The method of claim 5, further comprising providing on a display each detected SSID that does not correspond to an SSID broadcast by the vehicle wireless access point.

10. A system for identifying a potential wireless security threat on a vehicle in which the system is for use with wireless personal electronic devices, the system comprising:
a display and a broadband controller including a data processor and memory, in which the broadband controller provides a network within the vehicle;

a vehicle wireless access point in communication with the broadband controller in which the wireless access point broadcasts an SSID for use by a personal electronic device to establish a wireless communication link and transmit and receive data wirelessly over the network via the wireless access point;
a radio aboard the vehicle, the radio being configured to periodically scan for SSIDs broadcast in the vehicle in which SSIDs detected during scans are communicated to the broadband controller; and
logic executed by the data processor of the broadband controller in which for each detected SSID not corresponding to the vehicle wireless access point SSID, that detected SSID is logged to a file offloaded each trip by the vehicle.

11. The system of claim 10, wherein the vehicle wireless access point includes a plurality of radios, and said radio aboard the vehicle being configured to periodically scan for SSIDs comprises at least one of: a radio of the vehicle wireless access point, another wireless access point, and a personal electronic device.

12. The system of claim 10, further comprising a dedicated personal electronic device including at least:
a radio that can perform as a client for rogue APs;
a data processor and logic which when the logic is executed by the data processor performs detection of SSIDs that do not match a vehicle SSID; and
attempts to connect to each said SSID that does not match a vehicle SSID and if successful, attempts to connect to the web server having a private wide area network address.

13. The system of claim 10, further comprising an antenna connected to the broadband controller, in which the antenna receives and transmits signals from a source external to the vehicle, providing a broadband data connection to the broadband controller, over which the broadband controller logic reports a security threat to an external security operation center.

14. A system for identifying a potential wireless security threat on a vehicle in which the system is for use with wireless personal electronic devices, the system comprising:
broadband controller including a data processor and memory, in which the broadband controller provides a network within the vehicle;
a vehicle wireless access point in communication with the broadband controller in which the wireless access point broadcasts an SSID for use by a personal electronic device to establish a wireless communication link and transmit and receive data wirelessly over the network via the wireless access point;
a radio aboard the vehicle, the radio being configured to periodically scan for SSIDs broadcast in the vehicle in which SSIDs detected during scans are communicated to the broadband controller; and
a web server having a private wide area network address operated by the broadband controller logic, in which the web server is only accessible via the private wide area network address, and the web server logs the source IP address of any access thereto.

15. The system of claim 14, further comprising another server operated by the broadband controller logic, which detects new log entries by the web server having a private wide area network address, and determines the MAC address corresponding to the source IP address and the broadband controller logic blocks access to the network by a client having that MAC address.

16. A system for identifying a potential wireless security threat on a vehicle in which the system is for use with wireless personal electronic devices, the system comprising:
- a broadband controller including a data processor and memory, in which the broadband controller provides a network within the vehicle;
- a vehicle wireless access point in communication with the broadband controller in which the wireless access point broadcasts an SSID for use by a personal electronic device to establish a wireless communication link and transmit and receive data wirelessly over the network via the wireless access point; and
- a radio aboard the vehicle, the radio being configured to periodically scan for SSIDs broadcast in the vehicle in which SSIDs detected during scans are communicated to the broadband controller;
- wherein the vehicle wireless access point includes a plurality of radios and at least one radio of said plurality of radios is configured as a wireless client that attempts to associate with each SSID that does not correspond to an SSID broadcast by the wireless access point and if successful, connect to a web server having a private wide area network address.

17. A system for identifying a potential wireless security threat on a vehicle in which the system is for use with wireless personal electronic devices, the system comprising:
- a broadband controller including a data processor and memory, in which the broadband controller provides a network within the vehicle;
- a vehicle wireless access point in communication with the broadband controller in which the wireless access point broadcasts an SSID for use by a personal electronic device to establish a wireless communication link and transmit and receive data wirelessly over the network via the wireless access point;
- a radio aboard the vehicle, the radio being configured to periodically scan for SSIDs broadcast in the vehicle in which SSIDs detected during scans are communicated to the broadband controller; and
- logic executed by the data processor of the broadband controller in which for each detected SSID not corresponding to the vehicle wireless access point SSID, that detected SSID is reported to the broadband controller;
- wherein the vehicle includes staff onboard having a staff personal electronic device and the system includes a display on which the list of SSIDs which do not correspond to an SSID broadcast by the system is shown; and
- staff view the display and using the staff personal electronic device attempt to connect to each SSID displayed and if successful, then to a web server having a private wide area network address.

* * * * *